Jan. 12, 1954   F. TOLKIEN   2,665,667
RODLESS SLIDE VALVE REGULATING DEVICE
Filed April 14, 1950   12 Sheets-Sheet 2

APPLICANT
FRITZ TOLKIEN
By
Emery Holcombe & Blair

Jan. 12, 1954  F. TOLKIEN  2,665,667
RODLESS SLIDE VALVE REGULATING DEVICE
Filed April 14, 1950  12 Sheets-Sheet 9

APPLICANT
FRITZ TOLKIEN
By
Emery Holcombe & Blair

Jan. 12, 1954  F. TOLKIEN  2,665,667
RODLESS SLIDE VALVE REGULATING DEVICE
Filed April 14, 1950  12 Sheets—Sheet 10

APPLICANT
FRITZ TOLKIEN
BY
Emery Holcombe & Blair

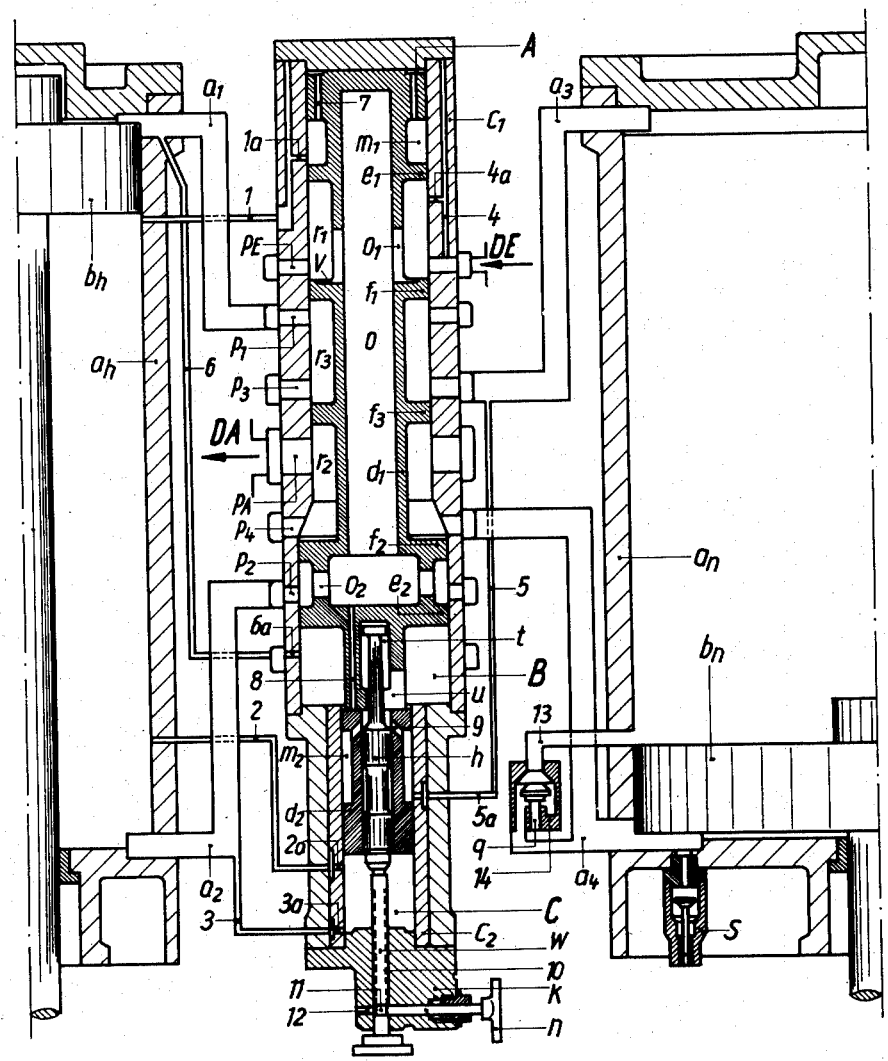

Patented Jan. 12, 1954

2,665,667

UNITED STATES PATENT OFFICE 2,665,667

RODLESS SLIDE VALVE REGULATING DEVICE

Fritz Tolkien, Hannover, Germany

Application April 14, 1950, Serial No. 155,869

17 Claims. (Cl. 121—108)

The present invention relates to valve gear for controlling the admission and exhaust of motive fluid to and from double acting piston engines.

According to the present invention there is provided a rodless slide valve having a main slide valve in the form of a differential piston, the piston portions of which are slidably mounted within a first main actuating chamber and a second main actuating chamber respectively, movement of the main slide valve in one direction, serving to connect the said first main actuating chamber to a supply source of motive fluid through a chamber and borings in the main slide valve, movement of the main slide valve in the opposite direction serving to cut off the supply of motive fluid to the said first main actuating chamber and to connect the said second main actuating chamber to the supply source of motive fluid.

According to the invention the regulating pressure is, therefore, not received through the working cylinder; this involves the disadvantage that, if steam is used as the motive fluid, the regulating steam can condense by the contact of larger cooling surfaces and then the reversal is not unconditionally reliable. A drop in pressure in the working cylinder may also occur in the case that piston rings and packings are not fluid-tight. The new slide valve has a shorter reversing period, it operates with a smaller consumption of motive fluid and operates smoothly without much noise.

Further according to the invention an auxiliary slide valve is provided which is connected to the main slide valve through a lost motion coupling movement of the main slide valve in a direction to cut off the motive fluid supply to the first said main actuating chamber causing the main slide valve to move relatively to the auxiliary slide valve to open a supply duct normally closed by contact between the main and auxiliary slide valves, to permit the supply of fresh motive fluid to the said second main actuating chamber.

In this way the reversal of the main slide valve does not depend upon the admission of motive fluid from the working cylinder to the said second actuating chamber. This is advantageous in the case of an air pump and in which it is possible for the working piston of the same to move as a result of expansion of the air when for example the main slide valve is in the mid-position.

Further, according to the invention, the said second main actuating chamber is placed in communication with the upper end of the working cylinder of the engine during a portion of the movement of the slide valve towards the motive fluid cut off position to said first main actuating chamber, so that motive fluid is supplied from said working cylinder to the said second chamber, completion of the movement of the main slide valve in said cut off direction placing said second chamber in communication with the atmosphere. In this way the pressure in the said second main actuating chamber, which produces the movement of the slide valve is supported, and on the other hand, the connection to atmosphere of the second main actuating chamber controlled by the main slide valve itself is accelerated, so that the auxiliary slide valve can follow up in good time the main slide valve, without the auxiliary slide valve being carried along with the main slide valve. Reliability in operation of a pump driven by the engine equipped with the slide valve of the present invention is in this way quite considerably increased.

For efficient working of the new slide valve when used with a steam engine having a vertically arranged steam cylinder it is also important to ensure the removal of water from the said steam cylinder. This is effected by an externally operated ram known per se, by means of which the slide valves can be moved mechanically into the water-removing position, which according to the invention, is characterised by the feature that the working piston is in its highest position and the slide valve unit is held in the corresponding position. The ram casing is provided with a longitudinal groove, which in the water removing position, connects the regulating chamber of the auxiliary slide valve with atmosphere. The water removing position can be the preheating position, in which the steam serving for the preheating can be seen to escape to atmosphere.

In the case of compound piston engines, according to a further feature of the invention a boring in the cylinder casing is uncovered by the low pressure piston in its lowest position through which water can be extracted from the low pressure cylinder and through a water extracting valve.

One distributing element of the main slide valve can be provided with an oil trough, thus facilitating the lubrication of the slide valve.

The slide valve according to the invention is applicable both to single-cylinder full pressure engines and also to compound engines with high pressure and low pressure cylinders disposed behind one another, or in side by side relationship, and three different constructional examples are illustrated in the accompanying drawings, wherein:

Fig. 12 illustrates a slide valve used with an upright double acting compound engine with high and low pressure cylinders in side by side relationship.

Figure 1:
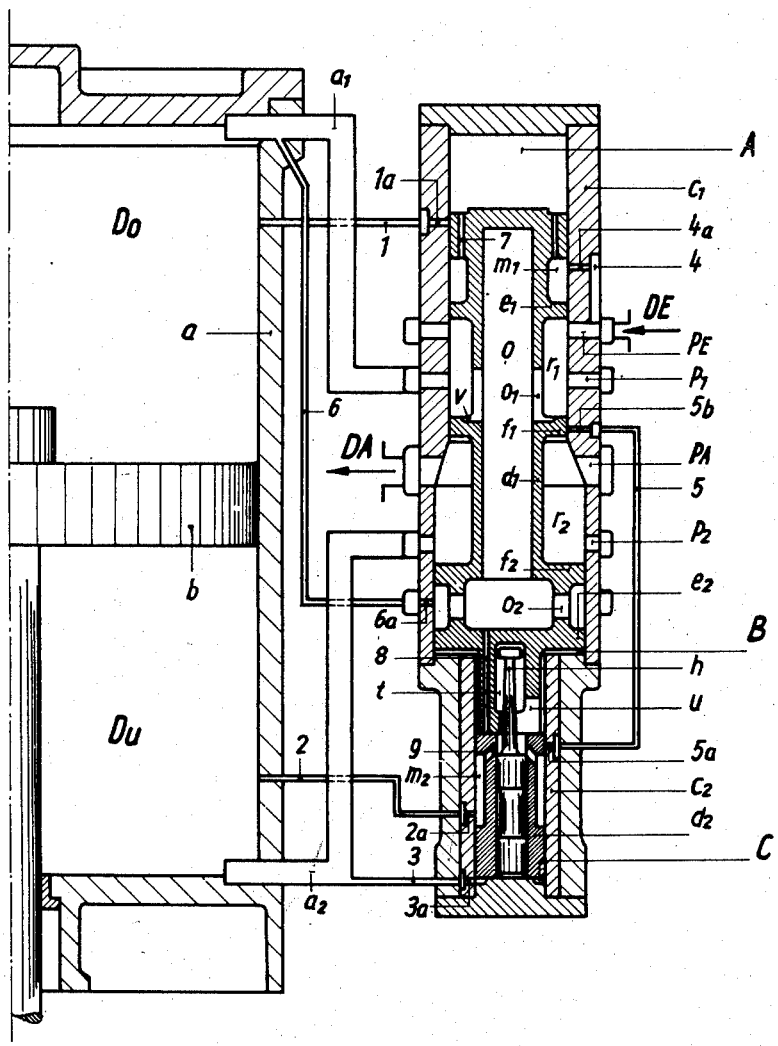
Figs. 1 to 4 illustrate one construction of a regulating device made in accordance with the invention for a double acting single cylinder piston engine, the figures showing respectively different operational positions of the parts.

The valve actuating operations take place in two main chambers and one auxiliary chamber, which are alternately connected with the working cylinder through the slide valve.

The upper or first main actuating chamber A is disposed above the front end of the main slide valve $d_1$, the lower or second main actuating chamber B between the main slide valve $d_1$ and the auxiliary slide valve $d_2$ and the auxiliary actuating chamber C is disposed below the auxiliary slide valve $d_2$.

The main slide valve is a hollow body formed with collars $e_1$, $f_1$ and $f_2$ to provide distributing chambers $r_1$ and $r_2$ in the main slide valve chest $c_1$. The hollow space $o$ in the main slide valve serves, together with the borings $o_1$ and $o_2$ in its wall, for supplying motive fluid to the working cylinder $a$. The exhaust motive fluid surrounds the main slide valve only in the distributing chamber $r_2$ and passes out through the lateral outlet DA.

The ducts $a_1$ and $a_2$ communicating with the working cylinder are connected in the main slide valve casing $c_1$ to the slots $p_1$ and $p_2$, which are alternately overrun by the distributing collars $f_1$ and $f_2$.

An actuating conduit 3 and boring 3a are connected to the duct $a_2$, the conduit and boring communicating with the auxiliary slide valve chamber C at the front end of the auxiliary slide valve $d_2$.

The main slide valve chamber $m_1$ alternately connects the upper or first actuating chamber A through the boring 7 in the main slide valve and the leak-off boring 1 with the working cylinder, and, through the fresh motive fluid regulating boring 4 and 4a, with the motive fluid inlet DE. The main slide valve base is formed with a pin like extension having a boring $t$ and a lateral slot $u$, which enables the driving bolt $h$ of the auxiliary slide valve $d_2$ to be mounted in the main slide valve $d_1$.

The auxiliary slide valve $d_2$ arranged below the main slide valve $d_1$ and provided with a chamber $m_2$ controls the supply of motive fluid to the lower or second main actuating chamber B, and its connection to atmosphere.

In its lower end position (Fig. 1) the auxiliary slide valve $d_2$ connects the leak-off boring 2 of the working cylinder with the second main actuating chamber B, through the boring 2a in the auxiliary slide valve chest, chamber $m_2$ and boring 9 in the auxiliary slide valve. In the top position of the slide valve unit (Figs. 3 and 4) the auxiliary slide valve $d_2$ provides communication, through the air extracting borings 5a, 5b and conduit 5, between the second main actuating chamber B and the outlet DA. In a pin-like extension of the main slide $d_1$, there is provided a small overflow boring 8 which is closed in a valve-like manner by the auxiliary slide valve disposed adjacent to the main slide valve, and is uncovered for only a short time in the lower reversing phase (Fig. 2) for the passage of fresh motive fluid to the main slide valve chamber B. A motive fluid holding boring 6a in the wall of the second main actuating chamber B communicates through the holding conduit 6 to the space above the working piston $b$.

The operation of the slide valve illustrated in Figs. 1 to 4 for a single cylinder engine is as follows:

In Fig. 1 the main slide valve $d_1$ is disposed with the auxiliary slide valve $d_2$ in the bottom end position in which the main slide valve is held by fresh motive fluid, which reaches the upper or first main actuating chamber A through the borings 4 and 4a, main slide valve chamber $m_1$ and boring 7. In this position of the main slide valve the motive fluid acts on the top of the working piston $b$ which moves downwards into the lower position (Fig. 2), in which it uncovers the leak-off boring 2. Pressure fluid flows from the working cylinder $a$ through the boring 2 to the auxiliary slide valve $d_2$ passing through the chamber $m_2$ and boring 9 in the auxiliary slide valve into the lower main regulating chamber B. Since the lower piston surface of the main slide valve is larger than the top surface the main slide valve is moved upwards. As soon as the main slide valve during its upward movement separates from the auxiliary slide valve, additional fresh motive fluid enters through the boring 8 from the steam inlet DE into the main regulating chamber B and thereby supports the upward movement of the main slide valve. Boring 8 prevents with certainty return movement of the main slide valve in the event that the working piston $b$ when driving an air pump should close prematurely under the action of the back pressure of the air, the lower leak-off boring 2 which would interrupt communication between the second main actuating chamber B and the working cylinder.

During the further upward movement of the main slide valve $d_1$, the collar $e_2$ of the main slide valve $d_1$, uncovers the holding boring 6a, which is in communication with the working cylinder and therefore is at the pressure prevailing in the working cylinder. In a similar way as through the boring 8 additional motive fluid can also pass through the holding boring 6 into the lower regulating chamber B, and support the upward movement of the main slide valve. The boring 6a thus assists in preventing back movement of the main slide valve, which is supported or held in its upward movement (which explains the term "steam holding conduit").

Figure 2:
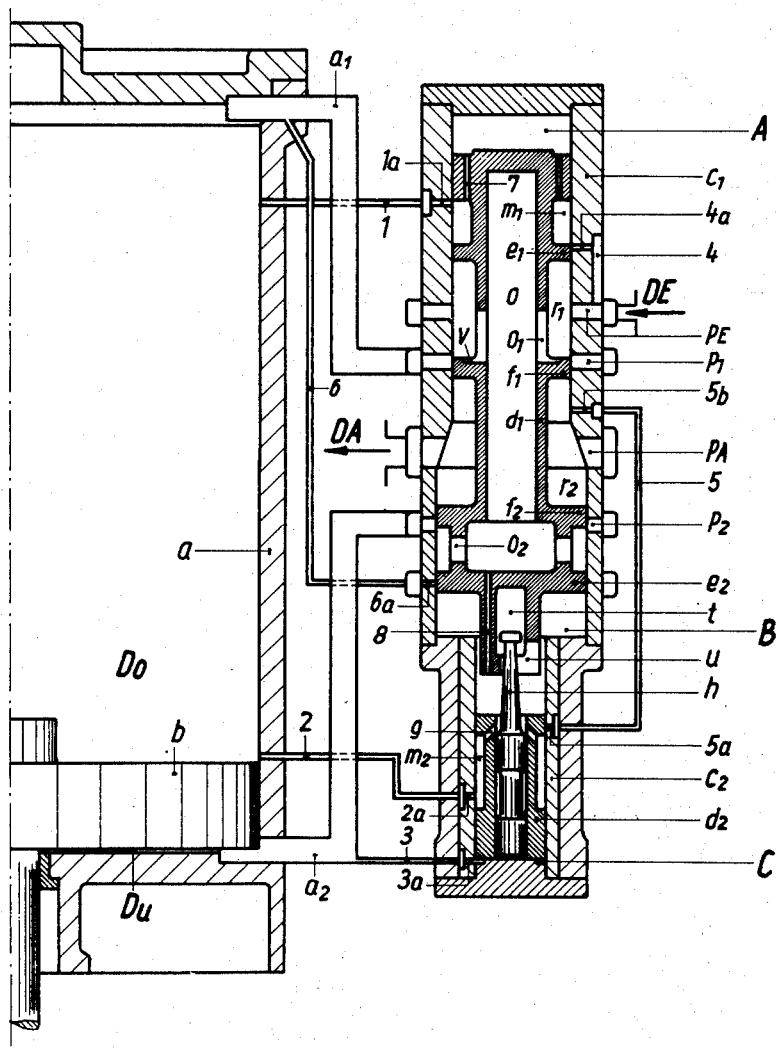

When the main slide valve $d_1$ reaches the middle position illustrated in Fig. 2, the lower cylinder duct $a_2$ also receives fresh motive fluid, which acts through the regulating duct 3 and boring $3_a$ on the lower end surface of the auxiliary slide valve $d_2$. The auxiliary slide valve remains however in the lower position, from which it moves only when in the further course of the movement of the main slide valve $d_1$ the distributing collar $f_1$ opens the slot $p_1$ to DA and initiates the exhaust of the motive fluid from the cylinder above the working piston.

Figure 3:
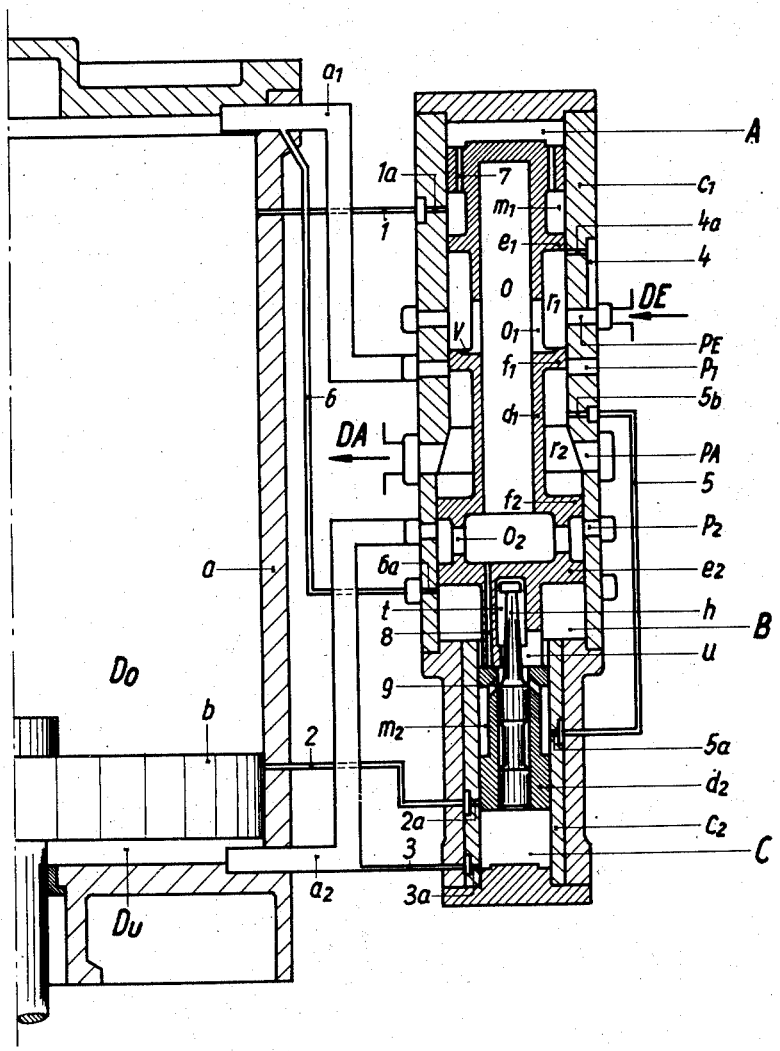
Figure 4:
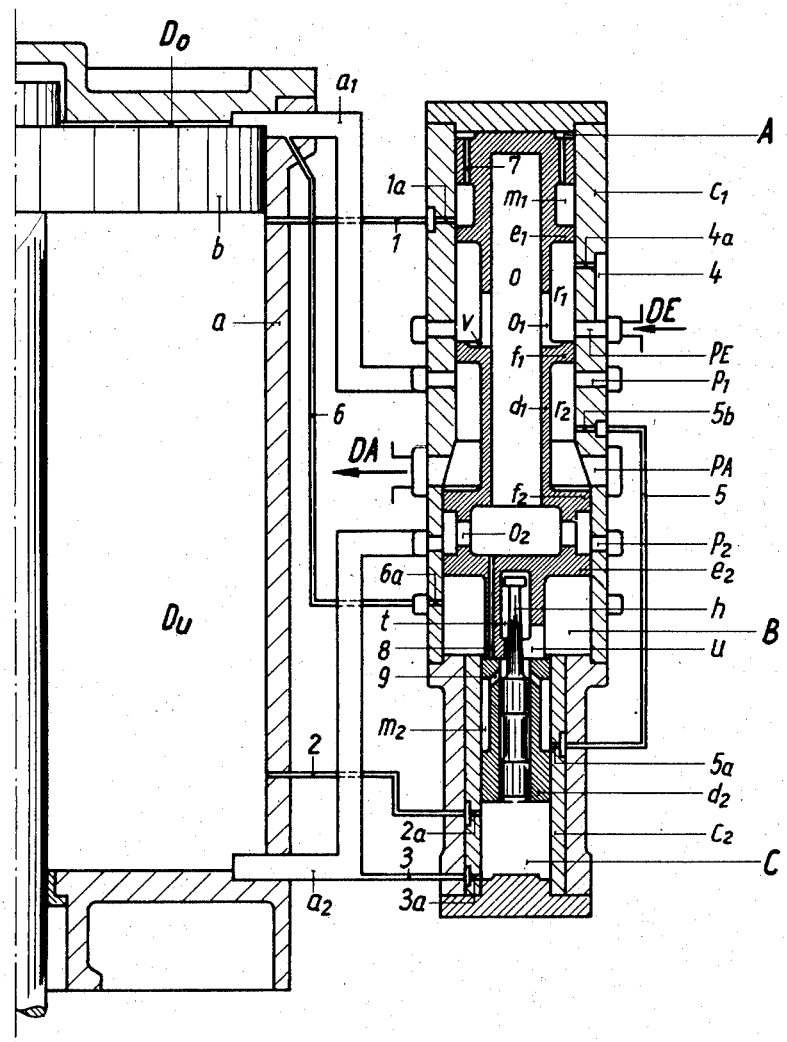

In this position, illustrated in Fig. 3, a pressure relief in the main slide valve chamber B corresponding to the outflow of the motive fluid takes place through the steam holding duct 6, $6_a$ in communication with the working cylinder. When the outflow of the motive fluid from the second main actuating chamber B begins the auxiliary slide valve starts its upward movement by reason of the preponderant pressure of the fresh motive fluid in the auxiliary actuating chamber C, so that the auxiliary slide valve is pressed against the main slide valve and closes the boring 8. Since the auxiliary slide valve is moved upwards with a small difference between the pressures in the main slide valve chamber and the auxiliary slide valve chamber and, on the other hand, the outflow of the motive fluid from the working cylinder proceeds only slowly, the boring 8 is closed fairly quickly, so that only a small amount of motive fluid can pass through the boring to the exhaust. In its upward movement the auxiliary slide valve uncovers the conduits $5_a$ and 5, through which a further connection to the atmosphere of the second main actuating chamber B takes place. After the auxiliary slide valve has reached the main slide valve, it completes its upward movement and firmly holds the main slide valve in the top position (Fig. 4).

It has been shown that by the additional supply to the second main actuating chamber through the regulating boring 8 and further by the double connection to atmosphere from the main slide valve chamber B an accelerated movement of the slide valve unit and thereby a substantial increase in the number of revolutions of the piston pressure engine can be achieved.

It is evident from the foregoing description that in normal operation the auxiliary slide valve is not driven by the main slide valve in the middle position, but is driven upwards by fresh motive fluid. The driving bolt $h$ with striker head on the auxiliary slide valve $d_2$ has merely the function of ensuring that in the top position of the slide valve unit, on starting a pump driven by an engine equipped with the slide valve the auxiliary slide valve under no condition remains in the lower end position, but is drawn so far upwards that the leak-off conduit $2_a$ is covered by the auxiliary slide valve and the connection of the lower or second main actuating chamber B to the atmosphere is made certain.

Fig. 3 shows that in the position of the slide valve movement illustrated therein practically only a movement of the slide valve takes place by the auxiliary slide valve being supplied with fresh motive fluid. The reversing forces are thereby reduced so that knocking of the slide valve is prevented, whilst on the other hand the valve, under the action of the forces arising from the action of fresh motive fluid completes its movement with certainty.

The movement of the main slide valve in the opposite direction, that is from the top end position into the bottom position, takes place as a result of the working piston $b$ uncovering in the top end position the leak-off boring 1 (Fig. 4).

The motive fluid passes through the leak-off boring 1, the main slide valve chamber $m_1$, and also through the borings 7 into the upper or first main actuating chamber A. Since only the relatively small front surface of the auxiliary slide valve is acted upon by the pressure of the fresh motive fluid, and the second main actuating chamber B is relieved to exhaust through the holding conduit 6 and through the auxiliary slide valve, its chamber $m_2$ and air extraction conduits $5_a$, 5 and $5_b$, after the first main actuating chamber A is supplied the main slide valve will commence its downward movement. When it reaches the middle position, the leak-off boring $1_a$ is covered by the collar $e_1$ of the main slide valve, whilst at the same time fresh motive fluid can pass through the borings 4 and $4_a$ into the top main slide valve chamber A. The remainder of the downward movement of the main slide valve is accordingly again effected by fresh motive fluid, whereby a reliable reversal is obtained.

For reliable operation of the slide valve the lubrication is of importance, and this can be effected in a particularly favourable manner when the auxiliary slide valve is arranged directly below the main slide valve. The cylinder lubricating oil is injected in the fresh motive fluid by an oil pump and reaches the chamber $r_1$ (Fig. 4), and through borings into the interior of the main slide valve. The distributing collar $f_1$ is provided with a groove $v$ in which the oil flowing downwards along the body of the main slide valve collects. The annular groove provided prevents the oil from passing to exhaust by reason of the superpressure of the motive fluid. The lubricating oil in the motive fluid in the main slide valve can pass smoothly through the boring 8 to the auxiliary slide valve, lubrication of which is thus ensured.

Figure 5:
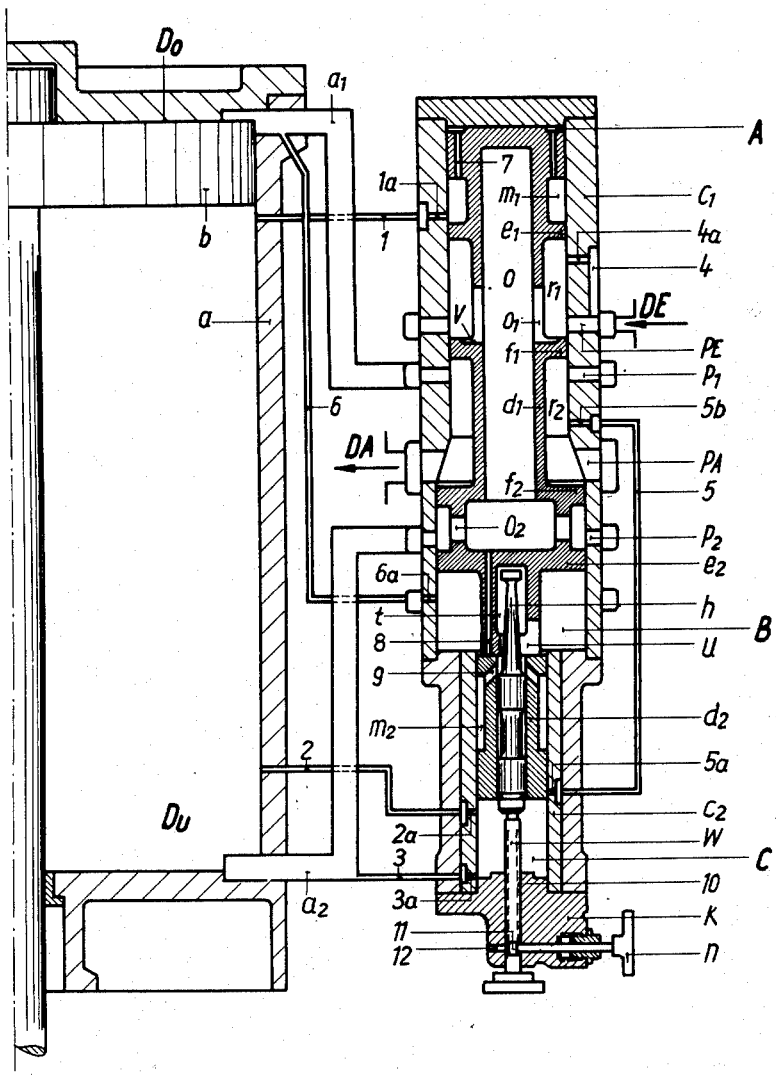
Fig. 5 illustrates a slide valve according to the invention for a vertically disposed double acting single cylinder piston engine.

Fig. 5 illustrates the slide valve for use with an upright double acting single-cylinder piston steam engine the slide valve being shown in a position in which condensate can flow out. The valve set is held in the upper end position by a holding device $k$ hereafter described. Steam throttled by the starting valve flows from DE through $r_1$, through the main slide valve $o_1$, $o$, $o_2$, $a_2$, enters underneath the working piston $b$, and forces the latter up against the steam cylinder cover, air being extracted from $D_o$ through the duct $a_1$ and the distributing chamber $r_2$ to DA. Throttled steam from $D_u$ can be seen to escape to atmosphere through the duct $a_2$ and the regulating borings 3, $3a$, 10, 11 and 12. The constant flow of steam prevents the collection of condensate and keeps hot the steam cylinder, the slide valve and the lubricating pump which is mounted on the steam cylinder. When the steam is shut off the condensate flows from the steam cylinder and the slide valve through the auxiliary actuating chamber C, the grooves 10 of the ram 1, the groove 11 and the boring 12 to atmosphere. The holding device K, which firmly holds the slide valve unit in the top end position consists of a ram with two water removing grooves 10 and a rotary groove 11, in which the holding bolt $n$ engages. Before the pump is started the holding device $n$ must be disengaged. The disengagement is effected thereby, that the handle is drawn outwards. After this the ram can be moved downwards, until its valve-like head produces a sealing of the chamber C against the atmosphere.

Figure 6:
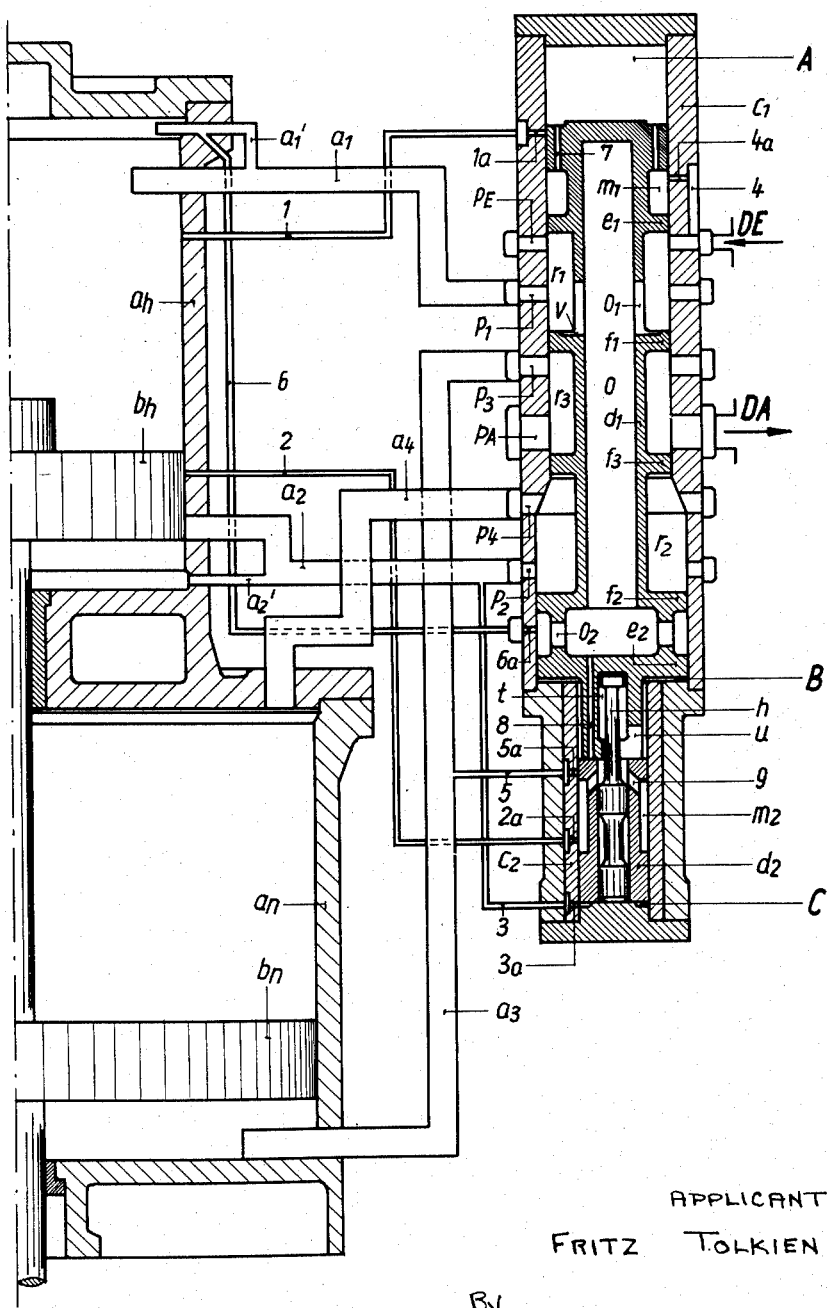
Figs. 6 to 8 illustrate a construction of slide valve for a compound engine with cylinders arranged in tandem, the figures showing respectively different operational positions of the parts.

Fresh motive fluid is also supplied to the inside of the main slide valve for compound piston engines shown in Figs. 6 to 12 which accordingly works with external edge inflow. In Fig. 6 the main slide valve and the auxiliary slide valve are disposed in the lower position, in which the high pressure piston $b_h$ receives motive fluid from above through the duct $a_1$. The motive fluid used below the high pressure piston $b_h$ flows through the duct $a_2$ into the annular chamber $r_2$ of the main slide valve and then, further, through the slot $p_4$, into the low pressure cylinder duct $a_4$ above the low pressure piston $b_n$. The motive fluid used below the low pressure piston $b_n$ passes through the cylinder duct $a_3$ and the annular duct $r_3$ of the main slide valve to exhaust DA.

The slide valve unit is held in the bottom end position by the motive fluid acting through the main slide valve in the top or first main actuating chamber A, which passes through the borings 4 and 4a and the main slide valve chamber $m_1$ and borings 7 in the main slide valve. As soon as the lower discharge boring 2 from the high pressure piston $b_h$ is uncovered (Fig. 7) the motive fluid passes out of the working cylinder $a_h$ through the auxiliary slide valve $d_2$ into the large main slide valve chamber B and forces the main slide valve $d_1$ upwards.

In the middle position of the main slide valve fresh motive fluid passes through the conduits 3 and 3a under the auxiliary slide valve $d_2$. During the further upward movement of the main slide valve its collar $e_2$ uncovers the conduits 6 and 6a, through which fresh motive fluid likewise flows into the second main actuating chamber B. Similarly to the case of the single cylinder engine described with reference to Figs. 1 to 4, the upward movement of the main slide valve is in this case also supported by fresh motive fluid, which flows through the overflow boring 8 in the pin of the main slide valve into the second main actuating chamber B. As soon as the main slide valve has passed the middle position the pressure of the motive fluid is relieved in a known way through the holding conduit 6 to the high pressure cylinder $a_h$, through the slot $p_1$ and the conduit $a_3$ towards the chamber below the low pressure piston $b_n$. The slide valve unit reaches finally the position illustrated in Fig. 8. The connection of the main slide valve actuating chamber B with the low pressure cylinder $a_n$ produces as in the slide valve for the single cylinder engine shown in Fig. 3 a reduction in the reversing force together with an impact-free reversal of the main slide valve $d_1$.

The movement of the main slide valve from the top end position (Fig. 8) proceeds in the same way as in the case of the slide valve according to Figs. 1 to 4. At the start of the reversal the slide valve chamber $r_2$ between the collars $f_3$ and $f_2$ is open to exhaust; however after passing the middle position of the main slide valve the motive fluid passing out of the high pressure cylinder to the low pressure cylinder is acting.

Figure 9:
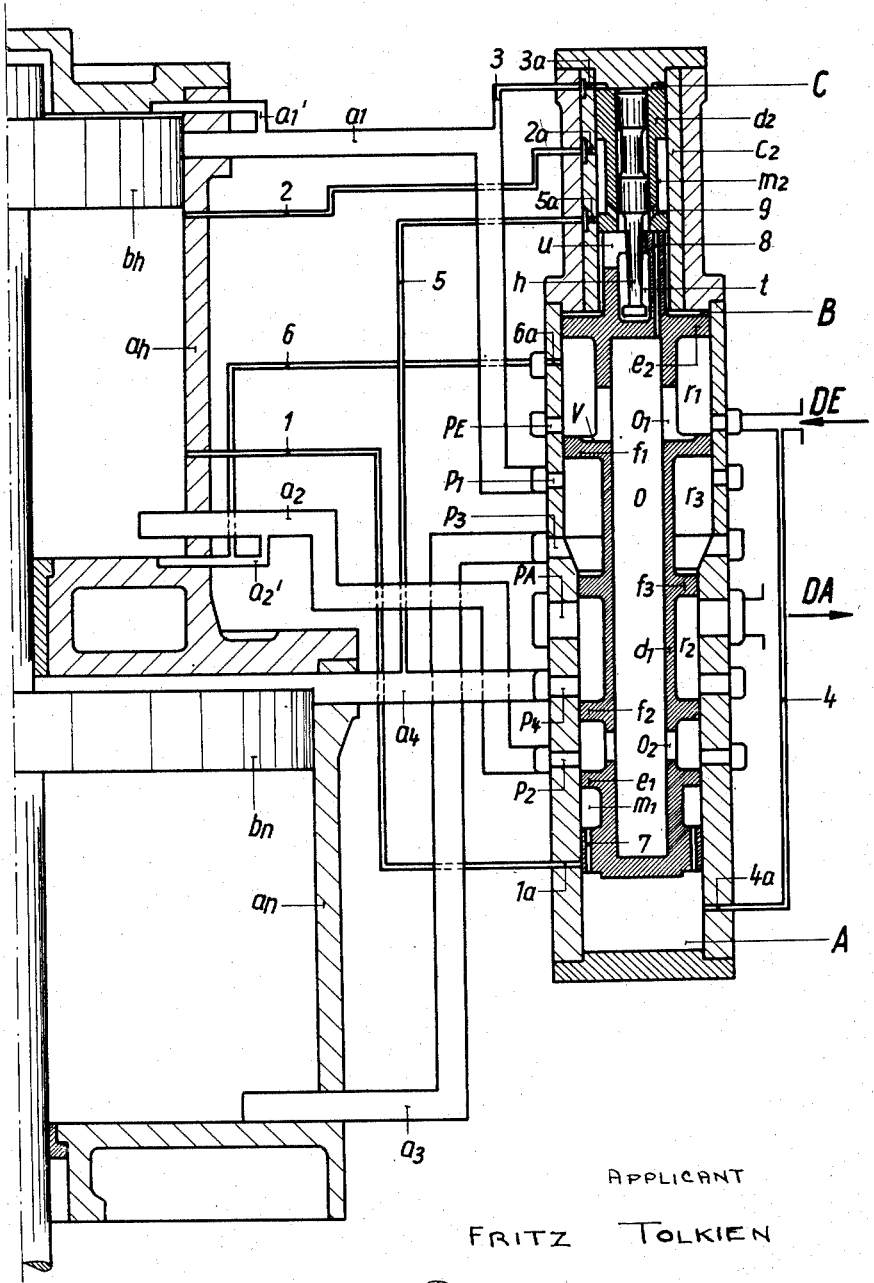
Fig. 9 illustrates a construction of slide valve with auxiliary slide valve arranged at the level of the cylinder cover in the case of a compound engine with the cylinders arranged in tandem.

Fig. 9 illustrates a constructional form of slide valve in which the auxiliary slide valve is arranged above the main slide valve. With this arrangement the slide valve unit is assembled from the bottom to the top. In this way in particular with tandem compound piston engines it is possible to arrange the slide valve quite close to the high pressure cylinder, thereby reducing harmful space and also the external dimensions of the engine, and the device can be better protected against radiation losses. In order to provide for introducing the motive fluid in the upper part of the slide valve chest, so that the lubricating oil reaches in a more reliable manner the valve parts disposed thereunder, the main slide valve has the construction shown in Fig. 9. For taking up the motive fluid and for regulating the ducts the large collars of the main slide valve $d_1$ are further apart. Even with this construction of the regulating device the lubrication of the auxiliary slide valve is ensured, since by reason of the superpressure of the motive fluid in the top position of the slide valve unit, the lubricating oil can pass through the top main regulating chamber to the auxiliary slide valve casing $C_2$.

Figure 10:
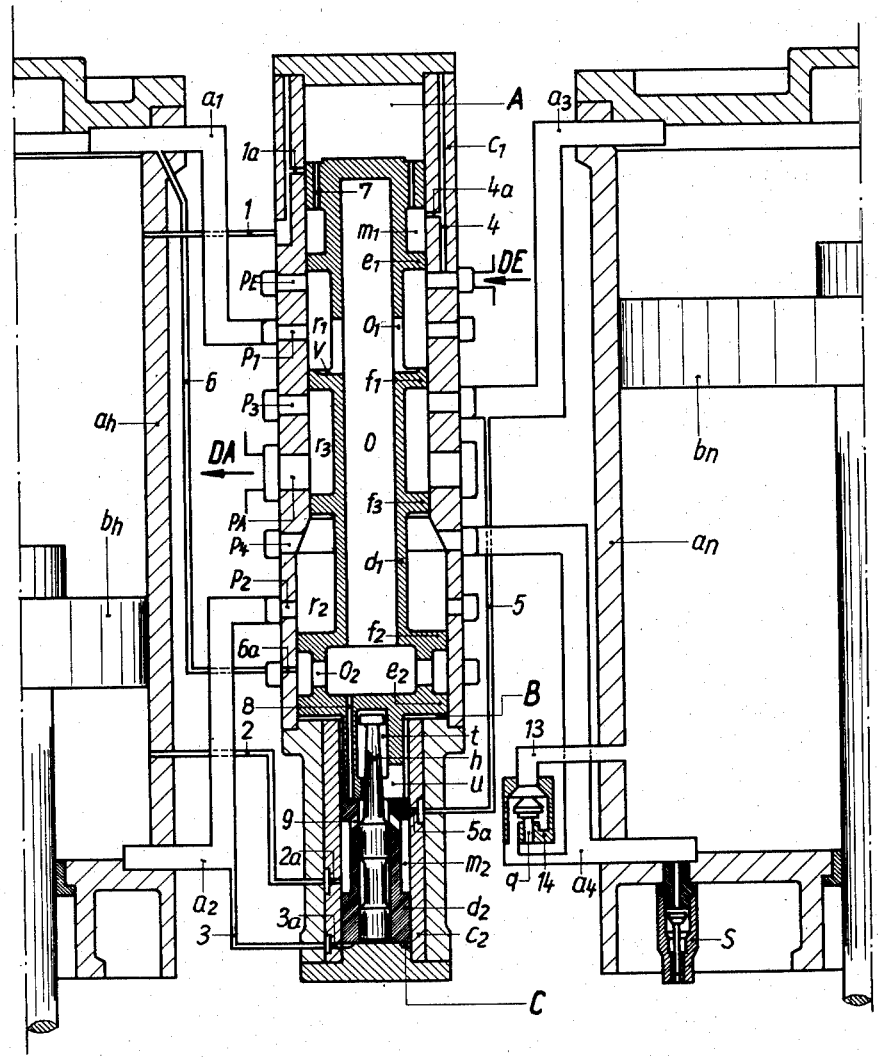
Figs. 10 and 11 illustrate a construction of slide valve for a compound engine with high and low pressure cylinders in side by side relationship.
Figure 11:
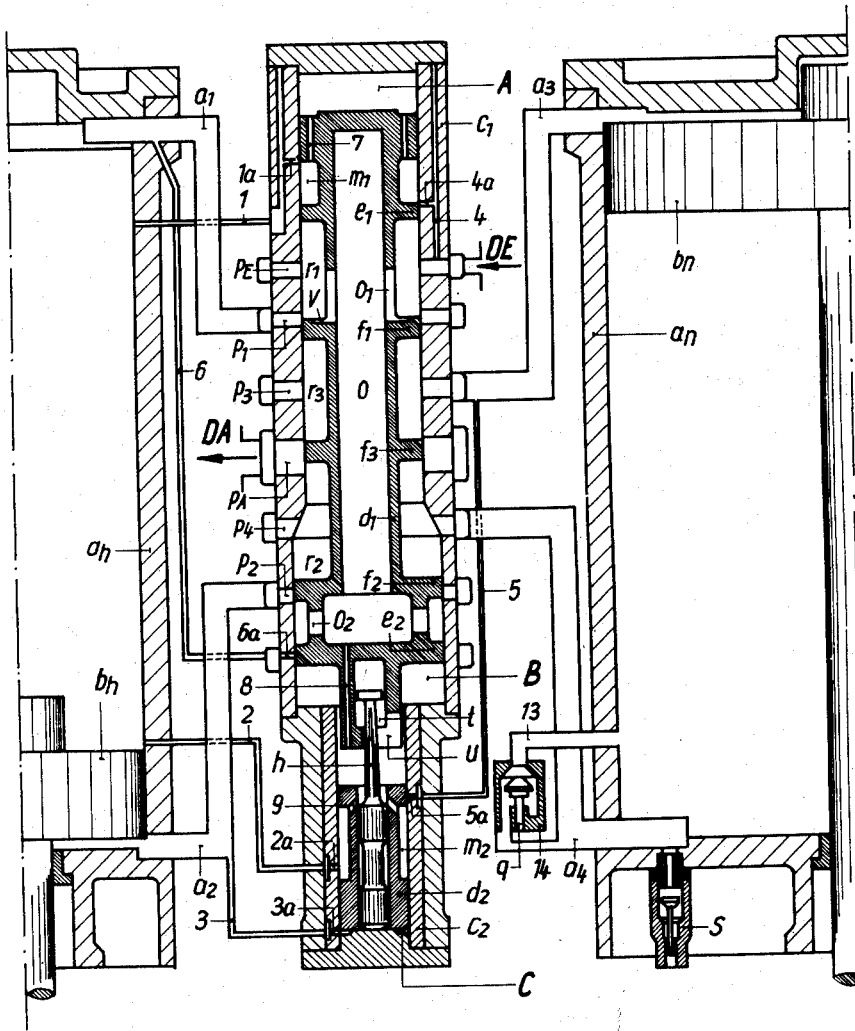

Figs. 10 to 12 illustrate a similar construction of slide valve for a compound piston engine with adjacently disposed high pressure and low pressure cylinders. The operation is similar to that above described. The stationary engine is freed from water through the valve S, which is held open when the engine is stationary by a spring or the like (not shown). The condensation water can then flow away out of the cylinder around the rod of the valve S. When the engine is in operation, the valve S is kept closed by the steam in the cylinder. The valve S is therefore permanently closed during the operation of the engine.

By providing only one auxiliary slide valve the starting of the slide valve is simpler and more reliable than is the case in known devices comprising two auxiliary slide valves. In the middle position of the main slide valve $d_1$ there are only two fundamental positions for the auxiliary slide valve, in one of which it is against the main slide valve and in the other of which it is separated therefrom.

Figure 7:
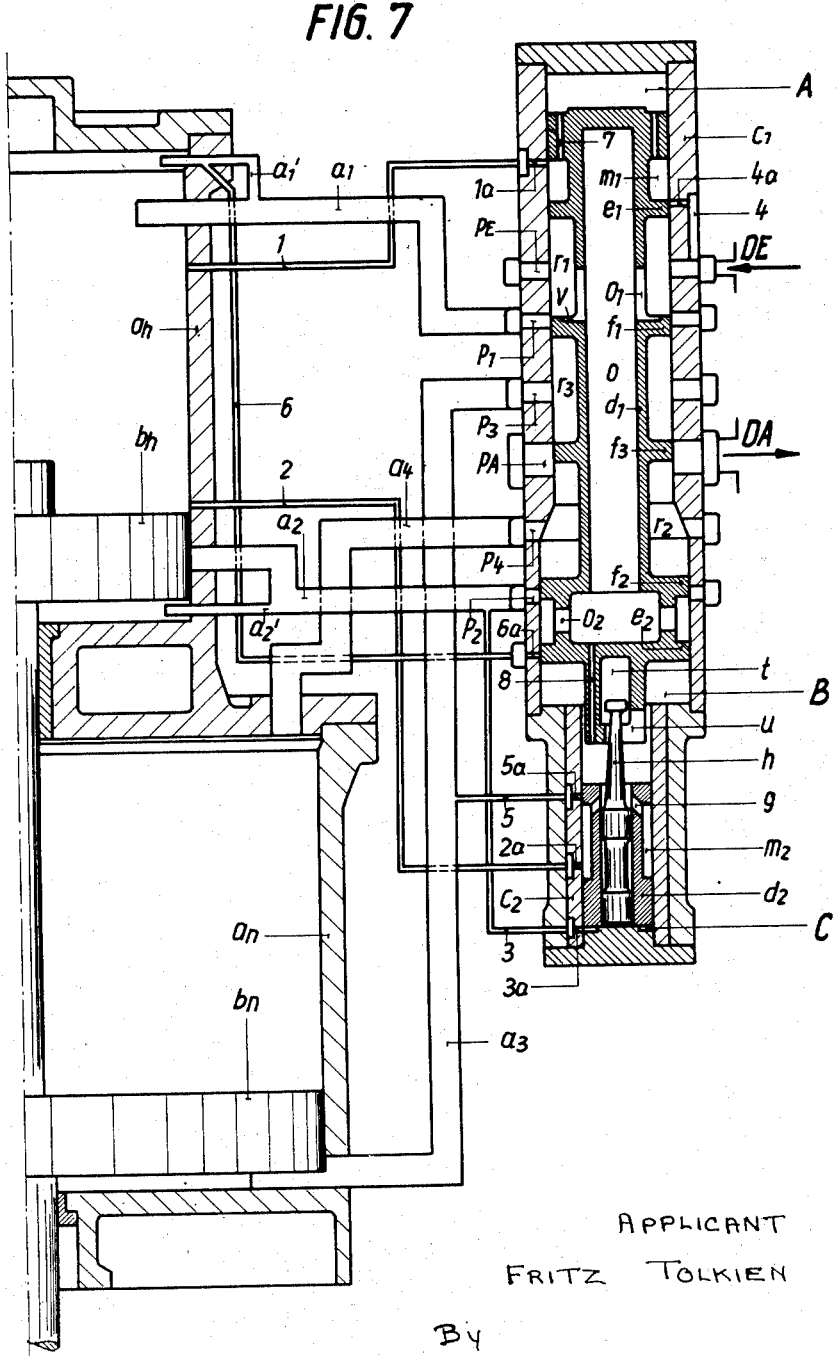
Figure 8:
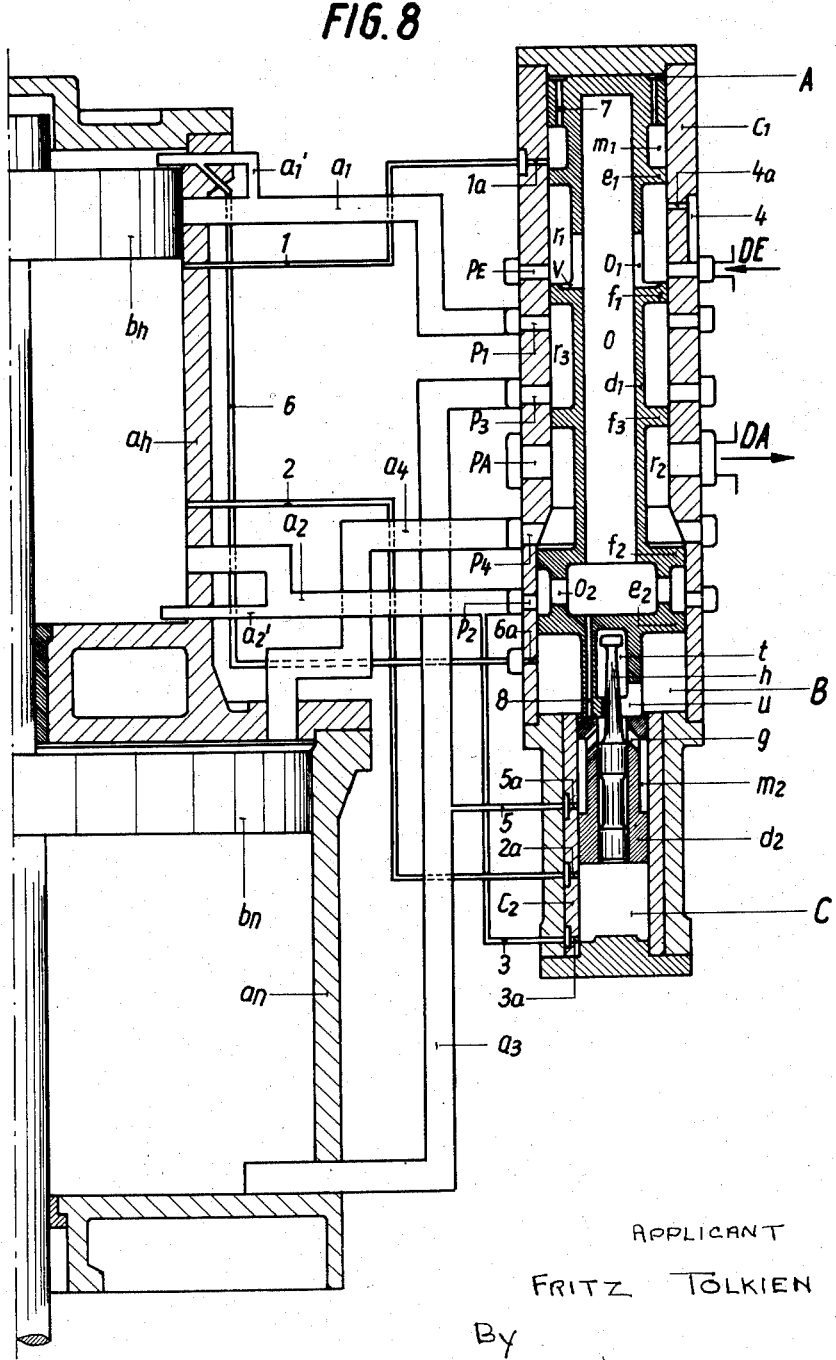

The covering surfaces on the main slide valve are so selected that in the middle position of the main slide valve $d_1$ both slots $p_1$ and $p_2$ are opened by the collars $f_1$ and $f_2$, so that fresh motive fluid can flow in above and below the working piston $b_n$ or $b_h$ (Figs. 2, 7 and 11). When the auxiliary slide valve $d_2$ is separated (Figs. 2, 7 and 11) the large regulating chamber B receives through the discharge conduits 1 and 2 communicating with the working cylinder fresh motive fluid, which forces the main slide valve upwards.

When the auxiliary slide valve is disposed against the main slide valve, the lower or second main actuating chamber B is relieved through the conduit 5 in communication with the exhaust and in compound engines with the low pressure cylinder. The motive fluid acting on the driving piston then drives the slide valve unit into the bottom end position.

In the device for compound piston engines the collar $f_2$ of the main slide valve $d_1$ controlling the outlet for the motive fluid is not so thick as the width of the outlet slot $p_A$ for the motive fluid, so that in the middle position of the main slide valve, and when the auxiliary slide valve is adjacent thereto, the large main regulating chamber B is brought into communication with the exhaust DA.

Fig. 12 illustrates a construction of regulating device for a compound piston engine with adjacently arranged high pressure and low pressure cylinders. The slide valve unit is held as in Fig. 5 in the top end position by the holding device $k$. In the case of a steam engine fresh steam from the starting valve flows from DE through $r_1$ through the main slide valve $o_1$, $o$, $o_2$, $a_2$ under the high pressure steam piston $b_h$ and forces it against the cover of the high pressure cylinder. The low pressure steam piston is disposed in the lower end position and by uncovering boring 13 removes water from the low pressure steam cylinder through a valve $q$ and a water removing valve $s$. Throttled steam from below the high pressure piston $b_h$ can be seen to escape to atmosphere through $a_2$, 3, $3_a$, 10, 11, 12. Accumulation of water in the steam cylinder above the steam piston is thereby reduced, and a quick starting of these piston engines, even from cold, is made certain. Since no water remains behind in the cylinders there is no rusting of the working surfaces of the cylinders.

What I claim and desire to secure by Letters Patent is:

1. A rodless slide valve regulating device for controlling the admission and exhaust of motive fluid to and from the cylinder of a double acting piston engine comprising a valve chest having a fresh motive fluid inlet in its wall and a first main actuating chamber, a differential piston mounted so as to be slidable in opposite directions in said valve chest and constituting a main slide valve, an auxiliary slide valve mounted in said valve chest and slidable therein independently of said main slide valve, a lost motion coupling operatively connecting said main and auxiliary slide valves, means for operating said main and auxiliary slide valves for effecting the regulated admission of motive fluid to the working cylinder and the exhaust therefrom to atmosphere, said means including a chamber confined between said main slide valve and the inner wall of said valve chest, borings in the wall of said valve chest permanently communicating with the fresh motive fluid inlet and adapted to be uncovered during reverse operation of said main slide valve to bring said chamber into communication with said motive fluid inlet, and borings in the head of said slide valve connecting said chamber with said first main actuating chamber, whereby after partial reversal of said main slide valve in one direction said main actuating chamber is connected through said borings and said chamber directly to said motive fluid inlet.

2. A rodless slide valve engine regulating device according to claim 1 in which a second main actuating chamber is formed in said valve chest between said main slide valve and said auxiliary slide valve and further comprising a duct in said main slide valve for supplying fresh motive fluid to said second main actuating chamber when the main slide valve is spaced from said auxiliary slide valve, said duct being closed automatically when said main slide valve is in contact with said auxiliary slide valve.

3. A rodless slide valve regulating device for controlling the admission and exhaust of motive fluid to and from the working cylinder of a double acting piston engine comprising a valve chest having a fresh motive fluid inlet in its wall, the outer end of said valve chest constituting an outer or first main actuating chamber, a differential piston mounted so as to be slidable in opposite directions in said valve chest, and constituting a main slide valve, an auxiliary slide valve mounted in said valve chest and slidable therein independently of said main slide valve, a lost motion coupling operatively connecting said main and auxiliary slide valves, an inner or second main actuating chamber between said main slide valve and said auxiliary slide valve, means for operating said main and auxiliary slide valves for effecting the regulated admission of motive fluid to the engine cylinder and the exhaust therefrom to atmosphere, said means including a chamber confined between said main slide valve and the inner wall of said valve chest, borings in the wall of said valve chest permanently communicating with the fresh motive fluid inlet and adapted to be uncovered during reverse operation of said main slide valve to bring said chamber into communication with said motive fluid inlet, and borings in the head of said main slide valve connecting said chamber with said first main actuating chamber whereby after partial reversal of said main slide valve said first main actuating chamber is connected through said borings and said chamber directly to said motive fluid inlet, a boring in said valve chest communicating with said inner or second main actuating chamber, means for connecting said boring with the engine cylinder, said boring being uncovered during outward movement of said main slide valve to provide passage for motive fluid from the engine cylinder to said inner or second main actuating chamber and for connecting said chamber to atmosphere on the completion of said movement of said main slide valve.

4. A rodless slide valve regulating device according to claim 3 in which said lost motion coupling operates to ensure that in the outer end position of said main slide valve said auxiliary slide valve cuts off the supply of the motive fluid from the engine cylinder to said inner or second main actuating chamber which is also connected to atmosphere.

5. A rodless slide valve regulating device for controlling the admission and exhaust of motive fluid to and from the working cylinder of a double acting piston engine comprising a valve chest having a fresh motive fluid inlet in its wall, the outer end of said valve chest constituting an outer or first main actuating chamber, a differential piston slidably mounted in said valve chest and constituting the main slide valve, an auxiliary slide valve mounted in said valve chest, and slidable therein independently of said main slide valve, a lost motion coupling operatively connecting said main and auxiliary slide valves, an inner or second main actuating chamber between said main slide valve and said auxiliary slide valve, an auxiliary regulating chamber formed in said valve chest below said auxiliary slide valve, means for operating said main and auxiliary slide valves for effecting the regulated admission of motive fluid to the engine cylinder and the exhaust therefrom to atmosphere, said means including a chamber confined between said main slide valve and the inner wall of said valve chest, borings in the wall of said valve chest permanently communicating with the fresh steam inlet and adapted to be uncovered during reverse operation of said main slide valve to bring said chamber into communication with said motive fluid inlet, and borings in the head of said main slide valve, connecting said chamber with said first main actuating chamber, whereby after partial reversal of said main slide valve said first main actuating chamber is connected through said borings and said chamber directly to said motive fluid inlet, and further comprising an externally operated ram for mechanically moving said slide valves to a position, in which the engine cylinder is opened to atmosphere through the auxiliary actuating chamber.

6. A rodless slide valve regulating device according to claim 5 in a compound piston engine, in which the low pressure cylinder of the engine is formed with a boring through its wall which is uncovered when the low pressure piston is in its end position, and further comprising a water removing valve and a duct operatively connecting said boring to said valve whereby when said low pressure piston is in its end position water of condensation can be drained from said low pressure engine cylinder through said valve.

7. A rodless slide valve regulating device for controlling the admission and exhaust of motive fluid to and from the working cylinder of a double acting piston engine comprising a valve chest having a fresh motive fluid inlet in its wall and a first main actuating chamber, a differential piston slidably mounted in said valve chest and constituting a main slide valve, an auxiliary slide valve mounted in said valve chest, substantially in line with the cover of the engine cylinder, a lost motion coupling operatively connecting said main and auxiliary slide valves, means for operating said main and auxiliary slide valves for effecting the regulated admission of motive fluid to the engine cylinder and the exhaust therefrom to atmosphere, said means including a chamber confined between said main slide valve and the inner wall of said valve chest, borings in the wall of said valve chest permanently communicating with the fresh motive fluid inlet and adapted to be uncovered during reverse operation of said main slide valve, to bring said chamber into communication with said motive fluid inlet, and borings in the head of said main slide valve, connecting said chamber with said first main actuating chamber whereby after partial reversal of said main slide valve said first main actuating chamber is connected directly through said borings and said chamber to said motive fluid inlet.

8. A rodless slide valve regulating device for controlling the admission and exhaust of motive fluid to and from the working cylinder of a double acting piston engine comprising a valve chest having a fresh motive fluid inlet in its wall and a first main actuating chamber formed therein, a differential piston slidably mounted in said valve chest and constituting a main slide valve, an auxiliary slide valve mounted in said valve chest and slidable therein independently of said main slide valve, a lost motion coupling operatively connecting said main and auxiliary slide valves, means for operating said main and auxiliary slide valves for effecting the regulated admission of motive fluid to the engine cylinder and the exhaust therefrom to atmosphere, said means including two collars in spaced relationship on said main slide valve, said collars defining respectively a fresh motive fluid inlet chamber and an exhaust motive fluid chamber between the outer surface of said main slide valve and the inner wall of said valve chest, said chambers being intermittently connected to the engine cylinder, a chamber confined between said main slide valve and the inner wall of said valve chest and borings in the wall of said valve chest permanently communicating with the fresh motive fluid inlet and adapted to be uncovered during reverse operation of said main slide valve, to bring said chamber into communication with said motive fluid inlet, and borings in the head of said main slide valve connecting said chamber with said first main actuating chamber, whereby after partial reversal of said main slide valve said first main actuating chamber is connected through said borings and said chamber directly to said steam inlet.

9. A rodless slide valve regulating device according to claim 8 wherein one of said collars is provided with a groove for lubricant.

10. In a rodless slide valve regulating device for double acting piston engines, a valve chest having a fresh motive fluid inlet in its wall, a main slide valve in the form of a differential piston, an auxiliary slide valve, both said valves being slidably mounted in said valve chest, a lost motion coupling operatively connecting said main and auxiliary slide valves, an outer or first main actuating chamber between the outer end of said main slide valve and the outer end of the valve chest, a collar on said main slide valve spaced from the outer end thereof, the diameter of the said valve being reduced between said outer end and said collar so as to form a chamber confined by said outer end, said collar and the wall of the valve chest, said wall of said valve chest being bored to provide communication between said motive fluid inlet and said chamber, the borings being permanently in communication with the said motive fluid inlet and the outer end of said main slide valve being bored to provide communication between said annular chamber and said outer or first main actuating chamber, said collar being arranged to uncover said boring in the wall of the valve chest after partial reversal of said main slide valve to connect said outer or first main actuating chamber through said borings to said fresh motive fluid inlet.

11. A rodless slide valve regulating device according to claim 10 in which said main slide valve is of hollow construction and its wall is apertured below said collar to provide communication between said steam inlet and the interior of said slide valve, and further comprising an inner or second main actuating chamber formed between the inner end of said main slide valve and said auxiliary slide valve and a boring in the bottom of said main slide valve affording communication between the interior thereof and said inner or second main actuating chamber, whereby fresh motive fluid is supplied to said inner main actuating chamber through said boring, when said boring is not closed by said auxiliary slide valve.

12. In a rodless slide valve regulating device for double acting piston engines, a valve chest having a fresh motive fluid inlet in its wall, a main slide valve in the form of a differential piston and an auxiliary slide valve, both said valves being slidably mounted in said valve chest, a lost motion coupling operatively connecting said main and auxiliary slide valves, an outer or first main actuating chamber between the outer end of said main slide valve and the outer end of the valve chest, a collar on said main slide valve spaced from the outer end thereof, the diameter of the said valve being reduced between said outer end and said collar so as to form a chamber confined by said outer end, said collar and the wall of the valve chest, said wall of said valve chest being bored to provide communication between said steam inlet and said chamber, said borings being in permanent communication with the said steam inlet and the outer end of said main slide valve being bored to provide communication between said annular chamber and said outer or first main actuating chamber, said collar being arranged to uncover said boring in the wall of the valve chest after partial reversal of said main slide valve to connect said outer or first main actuating chamber through said borings to said fresh motive fluid inlet and further comprising an engine cylinder, a cover for said engine cylinder, an inner or second main actuating chamber formed between the inner end of said main slide valve and said auxiliary slide valve, a boring in the wall of said valve chest communicating with said inner actuating chamber, and means affording communication between said boring and said engine cylinder underneath the cover thereof, said boring being uncovered during the outward movement of said main slide valve to supply additional motive fluid from said engine cylinder to said inner main actuating chamber and thereafter during the completion of this movement to connect said inner main actuating chamber to atmosphere.

13. A rodless slide valve regulating device according to claim 12 in which said main slide valve is of hollow construction and its wall is apertured below said collar to provide communication between said motive fluid inlet and the interior of said slide valve, and a boring in the bottom of said slide valve affording communication between the interior thereof and said inner or second main actuating chamber, whereby fresh motive fluid is supplied to said inner or second main actuating chamber through said boring, when said boring is not closed by said auxiliary slide valve.

14. In a rodless slide valve regulating device for double acting piston engines, a valve chest, a main slide valve and an auxiliary slide valve slidably mounted in said valve chest, a first main actuating chamber in said valve chest, a fresh motive fluid inlet in said valve chest, and means for bringing said first main actuating chamber into direct communication with said fresh motive fluid inlet, said means comprising borings in the wall of the valve chest in permanent communication with said fresh motive fluid inlet, borings in the main slide valve and a collar on the main slide valve adapted to uncover said borings in the valve chest after partial reversal thereof.

15. In a rodless slide valve regulating device for controlling the admission and exhaust of motive fluid to and from the working cylinder of a double acting piston engine, a valve chest, a hollow main slide valve and an auxiliary slide valve slidably mounted in said valve chest, a first main actuating chamber at the outer end of said valve chest, a second main actuating chamber between said main and auxiliary slide valves, a fresh motive fluid inlet in said valve chest, means operative after partial reversal of the main slide valve for bringing said first main actuating chamber into direct communication with said fresh motive fluid inlet, a duct in said main slide valve providing communication between the interior of said main slide valve and said second main actuating chamber when said main and auxiliary slide valves are separated, said main slide valve being in communication with said fresh motive fluid inlet through an aperture in the wall of said valve, whereby said second main actuating chamber is additionally supplied with fresh motive fluid when said main and auxiliary slide valves are separated, the arrangement being such that said duct in said main slide valve is closed by said auxiliary slide valve when the latter is in contact with said main slide valve.

16. A slide valve as claimed in claim 15 in which said valve chest has a boring communicating at one end with said inner or second main actuating chamber and at the other end with the engine cylinder underneath the cover thereof, said boring being uncovered during the outward movement of said main slide valve to supply additional motive fluid from said engine cylinder to said inner or second main actuating chamber and on the completion of said outward movement, to connect said inner or second main actuating chamber to atmosphere.

17. A slide valve as claimed in claim 15 further comprising a lost motion coupling operatively connecting said main and auxiliary slide valves and further in which said valve chest has a boring communicating at one end with said inner or second main actuating chamber and at the other end with the engine cylinder underneath the cover thereof, said boring being uncovered during the outward movement of said main slide valve to supply additional motive fluid from said engine cylinder to said inner or second main actuating chamber and on the completion of said outward movement, to connect said inner or second main actuating chamber to atmosphere, said lost motion coupling permitting relative movement between the main slide valve and auxiliary slide valve that in the outer end position of said main slide valve said auxiliary slide valve is operated to cut off the supply of motive fluid from the engine cylinder to said inner or second main actuating chamber and to connect the same to atmosphere.

FRITZ TOLKIEN.

References Cited in the file of this patent

UNITED STATES PATENTS

| Number | Name | Date |
|---|---|---|
| 952,617 | Humbarger et al. | Mar. 22, 1910 |
| 1,723,449 | Tolkien | Aug. 6, 1929 |
| 1,919,402 | Thompson | July 25, 1933 |

FOREIGN PATENTS

| Number | Country | Date |
|---|---|---|
| 478,194 | Germany | June 22, 1929 |
| 607,649 | Germany | Jan. 4, 1935 |
| 543,667 | Germany | Mar. 14, 1935 |
| 35,155 | Netherlands | Apr. 15, 1935 |
| 893,002 | France | Jan. 17, 1944 |